(12) United States Patent
Narasimhan et al.

(10) Patent No.: US 7,840,503 B2
(45) Date of Patent: Nov. 23, 2010

(54) **LEARNING A\* PRIORITY FUNCTION FROM UNLABELED DATA**

(75) Inventors: Mukund Narasimhan, Bellevue, WA (US); Paul A. Viola, Seattle, WA (US); Gregory Druck, Northampton, MA (US)

(73) Assignee: Microsoft Corporation, Redmond, WA (US)

(\*) Notice: Subject to any disclaimer, the term of this patent is extended or adjusted under 35 U.S.C. 154(b) by 745 days.

(21) Appl. No.: 11/786,006

(22) Filed: Apr. 10, 2007

(65) Prior Publication Data

US 2008/0256007 A1 Oct. 16, 2008

(51) Int. Cl.
*G06F 15/18* (2006.01)
(52) U.S. Cl. .............. 706/12; 706/20; 706/45; 707/706; 707/713; 707/748; 707/758
(58) Field of Classification Search .............. 706/20, 706/12, 45; 707/706, 713, 748, 758
See application file for complete search history.

(56) References Cited

U.S. PATENT DOCUMENTS

| | | | |
|---|---|---|---|
| 5,168,549 A | 12/1992 | Takagi et al. | |
| 6,556,960 B1 | 4/2003 | Bishop et al. | |
| 6,697,788 B1 | 2/2004 | Fukuda et al. | |
| 6,931,608 B1 | 8/2005 | Teig et al. | |
| 7,024,360 B2 * | 4/2006 | Savic et al. | 704/256 |
| 7,529,761 B2 * | 5/2009 | Wen et al. | 707/101 |
| 2005/0105723 A1 | 5/2005 | Dupaquis et al. | |
| 2005/0129122 A1 | 6/2005 | Booth et al. | |
| 2005/0143845 A1 | 6/2005 | Kaji | |
| 2005/0267885 A1 | 12/2005 | Klier | |
| 2006/0045337 A1 | 3/2006 | Shilman et al. | |
| 2006/0245654 A1 | 11/2006 | Viola et al. | |
| 2007/0011123 A1 | 1/2007 | Ruml et al. | |

OTHER PUBLICATIONS

Pearl, Judea; Kim, Jin H., "Studies in Semi-Admissible Heuristics," Pattern Analysis and Machine Intelligence, IEEE Transactions on , vol. PAMI-4, No. 4, pp. 392-399, Jul. 1982.*
Kohli, P.; Torr, P.H.S., "Efficiently solving dynamic Markov random fields using graph cuts," Computer Vision, 2005. ICCV 2005. Tenth IEEE International Conference on , vol. 2, No. pp. 922-929 vol. 2, Oct. 17-21, 2005.*

(Continued)

*Primary Examiner*—Michael B. Holmes
*Assistant Examiner*—David H Kim (57) ABSTRACT

A technique for increasing efficiency of inference of structure variables (e.g., an inference problem) using a priority-driven algorithm rather than conventional dynamic programming. The technique employs a probable approximate underestimate which can be used to compute a probable approximate solution to the inference problem when used as a priority function ("a probable approximate underestimate function") for a more computationally complex classification function. The probable approximate underestimate function can have a functional form of a simpler, easier to decode model. The model can be learned from unlabeled data by solving a linear/quadratic optimization problem. The priority function can be computed quickly, and can result in solutions that are substantially optimal. Using the priority function, computation efficiency of a classification function (e.g., discriminative classifier) can be increased using a generalization of the A\* algorithm.

19 Claims, 6 Drawing Sheets

OTHER PUBLICATIONS

Bagchi, A. and Mahanti, A. 1983. Search Algorithms Under Different Kinds of Heuristics-A Comparative Study. J. ACM 30, 1 (Jan. 1983), 1-21.*

Baksalary, J. K. and Mathew, T. 1988. Admissible linear estimation in a general Gauss-Markov model with an incorrectly specified dispersion matrix. J. Multivar. Anal. 27, 1 (Oct. 1988), 53-67.*

Aron Culotta and Ron Bekkerman and Andrew Mccallum. Extracting Social Networks and Contact Information from Email and the Web. Proceedings of the First Conference on Email and Anti-Spam. Jul. 2004.*

Dechter, R. and Pearl, J. 1985. Generalized best-first search strategies and the optimality of A*. J. ACM 32, 3 (Jul. 1985), 505- 536.*

Eaton, M. L. 1999 Markov Chain Conditions for Admissibility in Estimation Problems with Quadratic Loss. Technical Report. UMI Order No. PNA-R9904., CWI (Centre for Mathematics and Computer Science).*

Korf, R. E. and Reid, M. 1998. Complexity analysis admissible heuristic search. In Proceedings of the Fifteenth National/Tenth Conference on Artificial intelligence/innovative Applications of Artificial intelligence (Madison, Wisconsin, United States). American Association for Artificial Intelligence, Menlo Park, CA, 305-310.*

Kristjansson, T., Culotta, A., Viola, P., and McCallum, A. 2004. Interactive information extraction with constrained conditional random fields. In Proceedings of the 19th National Conference on Artifical intelligence (San Jose, California, Jul. 25-29, 2004). A. G. Cohn, Ed. Aaai Conference On Artificial Intelligence. AAAI Press / The MIT Press.*

Andrew McCallum. Efficiently Inducing Features of Conditional Random Fields. In Proceedings of the 19th Conference in Uncertainty in Articifical Intelligence (UAI-2003). 2003.*

Sarawagi, S., & Cohen, W. W. (2004). Semi-Markov conditional random felds for information extraction. Proceedings of the Eighteenth Annual Conference on Neural Information Processing Systems (NIPS-2004).*

Daumé, H. and Marcu, D. 2005. Learning as search optimization: approximate large margin methods for structured prediction. In Proceedings of the 22nd international Conference on Machine Learning (Bonn, Germany, Aug. 7-11, 2005). ICML '05, vol. 119. ACM, New York, NY, 169-176. DOI= http://doi.acm.org/10.1145/1102351.1102373, sec. 1-5.*

L. Harris, The bandwidth heuristic search. In: Proceedings International Joint Conferences on Artificial Intelligence (1973), pp. 23-29.*

Russel and Norvig, Artificial Intelligence. Pearson Education, Inc. 2003. Chapter 4.1, pp. 94-110.*

Dixon, et al., "Inference methods for a pseudo-Boolean satisfiability solver", Date: 2002, http://www.cs.mcgill.ca/~cmeagh1/CS566/AAAI02Dixon.pdf.

Tillman, Christoph, "Efficient Dynamic Programming Search Algorithms for Phrase-Based SMT", Date: Jun. 2006, http://acl.ldc.upenn.edu/W/W06/W06-3602.pdf.

Viola, et al., "Learning to Extract Information from Semistructured Text using a Discriminative Context Free Grammar"; Date: Aug. 2005, http://delivery.acm.org/10.1145/1080000/1076091/p330-viola.pdf? key 1=1076091&key2=8266781711&coll=GUIDE&d1=GUIDE&CFID-147275 48&CFTOKEN=17436925.

* cited by examiner

LEARNING A* PRIORITY FUNCTION FROM UNLABELED DATA

BACKGROUND

With processor speed and efficiency increases, computers have frequently employed artificial intelligence techniques to solve complex problems. These artificial intelligence techniques can be used to classify to which of a group of categories, if any, a particular item belongs. More particularly, inference problems involving structured outputs occur in a number of problems such as entity extraction, document classification, spam detection, sophisticated user interfaces, and the like.

Conventionally, dynamic programming has been widely used for decoding probabilistic models with structured outputs such as Hidden Markov Models (HMMs), Conditional Random Fields (CRFs), semi-Markov CRFs, and Stochastic Context Free Grammars (SCFGs). While dynamic programming yields a polynomial time algorithm for decoding these models, it can be too slow. For example, finding the optimal parse in a SCFG requires $O(n^3)$ time, where n is the number of tokens in the input. When SCFGs are used for decoding extremely large inputs (such as in information extraction applications) or bioinformatics applications, an $O(n^3)$ algorithm can be excessively expensive. Even for simpler models like HMMs, for which decoding is $O(n)$, the hidden constants (a quadratic dependence on the number of states) can make dynamic programming unusable when there are many states.

As a result, a number of alternatives to dynamic programming have been proposed such as Beam search, best-first decoding, and A* algorithm. A* is a graph search algorithm that employs a heuristic estimate that ranks each node by an estimate of the best route that goes through that node. Neither beam search nor best-first decoding are guaranteed to find the optimal solution. While A* is guaranteed to find the optimal solution, using A* requires finding admissible underestimates. Both A* and best-first decoding fall into a class of algorithms called priority-based search techniques. A priority queue of partial solutions is maintained, and at each step, the partial solution with the lowest value of the priority function is taken off the queue. This partial solution is expanded to generate other partial/complete solutions which are added to the queue. This process continues until a complete solution is taken off the priority queue, at which point the search stops. Best-first decoding uses the cost of the current solution as the priority function guiding the search, while A* uses the sum of the cost of the current solution and an optimistic estimate (underestimate) of the cost of completing the solution.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

A technique for increasing efficiency of inference of structure variables (e.g., an inference problem) using a priority-driven algorithm rather than conventional dynamic programming is provided. The technique employs a probable approximate underestimate which can be used to compute a probable approximate solution to the inference problem when used as a priority function (referred to herein as "a probable approximate underestimate function") for a more computationally complex classification function (e.g., a discriminative classifier). The probable approximate underestimate function can have a functional form of a simpler and easier to decode model. The model can be learned, for example, from unlabeled data by solving a linear/quadratic optimization problem. The priority function can be computed quickly, and can result in solutions that are substantially optimal.

A computer-implemented system for inferring structured variables includes a classification function for classifying data. The classification function employs a priority function that utilizes a probable approximate underestimate learned from unlabeled data. The system provides a structured output of the data based on classification information computed by the classification function.

Using the priority function, the efficiency of a classification function (e.g., semi-Markov CRFs, discriminative parsers, and the like) can be increased using a generalization of an A* algorithm. Further, the technique resolves one of the biggest obstacles to the use of A* as a general decoding procedure (e.g., arriving at an admissible priority function).

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The disclosed architecture employs a technique for increased efficiency in inferencing of structured variables (e.g., an inference problem) using a priority-driven algorithm rather than conventional dynamic programming. A priority-driven search algorithm returns an optimal answer if a priority function is an underestimate of a true cost function.

The technique employs a probable approximate underestimate which can be used to compute a probable approximate solution to the inference problem when used as a priority function (referred to herein as "a probable approximate underestimate function") for a more computationally complex classification function. The probable approximate underestimate function can have a functional form of a simpler, easy to decode model than the classification function. Further, in one example, the model can be learned from unlabeled data by solving a linear/quadratic optimization problem. In this manner, the priority function can be computed quickly, and can result in solutions that are substantially optimal.

Using the technique, a classification function (e.g., semi-Markov CRFs, discriminative parsers, and the like) can be sped up using a generalization of the A* algorithm. Further, this technique resolves one of the biggest obstacles to the use of A* as a general decoding procedure, namely that of coming up with an admissible priority function. In one embodiment, applying the technique can result in an algorithm that is substantially more efficient for decoding semi-Markov Conditional Markov Models (e.g., more than three times faster than a dynamic programming algorithm such as the Viterbi algorithm).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Figure 1:
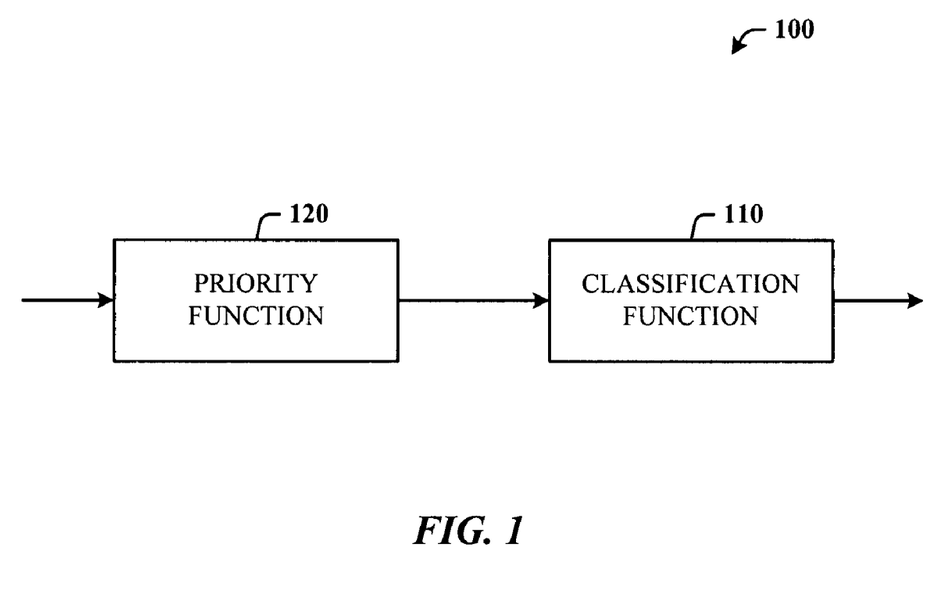
FIG. 1 illustrates a computer-implemented system for inferring structured variables.

Referring initially to the drawings, FIG. 1 illustrates a computer-implemented system 100 for inferring structured variables. The system 100 includes a classification function 110 for classifying data and employs a priority function 120 that utilizes a probable approximate underestimate learned from unlabeled data (e.g., probable approximate underestimate function). In this manner, the priority function 120 can be computed quickly, and can result in solutions that are substantially optimal.

The classification function 110 assigns a score to each of a plurality of hypothetical structured variables. Through inference, the classification function 110 searches for a best scoring hypothesis with the search being guided by the probably approximate priority function 120. The system 100 then provides a structured output of the data based on classification information computed by the classification function 110.

The system 100 is based on a technique for speeding up inference of structured variables using a priority-driven search algorithm rather than conventional dynamic programming. As noted previously, in general, a priority-driven search algorithm returns an optimal answer if the priority function is an underestimate of a true cost function.

In conjunction with the priority function 120, the classification function 110 (e.g., semi-Markov CRFs, discriminative parsers, and the like) can employ a generalization of the A* algorithm, for example, to obtain increase classification efficiency. Further, the technique resolves one of the biggest obstacles to the use of A* as a general decoding procedure (e.g., an admissible priority function).

As priority-based techniques perform additional work at each step when compared to dynamic programming, the priority function 120 prunes a substantial part of the search space in order to be effective. Further, since the priority function 120 is computed for each step, for each partial solution, in one embodiment, the priority function 120 is computed quickly. In this embodiment, for A* to be effective (e.g., faster than the Viterbi algorithm), the underestimate needs to be "tight", and fast to compute.

This has been one of the main obstacles to the general use of A* as computing tight, inexpensive underestimates can be difficult. Thus, algorithms which are fast, but offer no optimality guarantees (e.g., best-first decoding and beam search) have been introduced. Further, algorithms which prune the search space to find the optimal solution, but are often not as fast as the approximate algorithms have been generated. The priority function 120 is based on a general technique that can be used to produce solutions (e.g., close to optimal) by allowing tradeoffs between computations requirements and a degree of approximation In order to more fully discuss the probable approximate underestimate function employed by the priority function 120, in general, the prediction/inference problem is to find a mapping f: $\Xi \rightarrow \Psi$, where $\Xi$ is the input space and $\Psi$ is the output space such that $$f(x) = \mathrm{argmin}_{y \in Y} \mathrm{cost}(y|x)$$

When there is an underlying probabilistic model, the scoring function $\mathrm{cost}(y|x)$ is typically the negative log likelihood $-\log p(y|x)$. However, it is to be appreciated there are other models where the cost function is not derived from a purely probabilistic model (e.g., margin based models, voting based models, loss based models, etc.) can be employed.

In many problems, the input and output spaces have associated structure. For example, the space $\Xi$ can be the space of sequences of observations (e.g., words, nucleic/amino acids, etc.) and the output space $\Psi$ can be the space of sequences of labels (e.g., part-of-speech tags, coding/non-coding binary labels, etc.). In these problems, the size of the input/output domains is exponential in the length of the sequences, and hence exhaustive search cannot be used to find $\mathrm{argmin}_{y \in Y}\mathrm{cost}(y|x)$. In some cases, the cost function also has associated structure, such as the Markov property, which allows for computing $\mathrm{argmin}_{y \in Y}\mathrm{cost}(y|x)$ in time polynomial in the length of the sequence.

For purposes of explanation, consider an example of labeling sequences of observations where the input space is $\Xi = O^n$, the output space is $\Psi = \Lambda^n$, and O and $\Lambda$ are the set of observations and labels, respectively. It is to be appreciated that the techniques set forth herein apply to other structured prediction problems and the hereto appended claims are intended to encompass those structured prediction problems.

Each element $l = \langle l_1, l_2, \ldots, l_m \rangle \in \Lambda^n = \Psi$ represents an assignment of a label to every observation in the input. Further, $l_{[1:k]} = \langle l_1, l_2, \ldots, l_k \rangle$ can be called a partial output and is an assignment of labels to a prefix of the input sequence. The cost function satisfies the Markov property if it assigns a cost to each partial output satisfying:

$$\mathrm{cost}(l_{[1:k+1]}|x) = \mathrm{cost}(l_{[1:k]}|x) + \phi_k(l_k, l_{k+1}|x)$$

Once $\phi_k(l_k, l_{k+1}|x)$ and $\mathrm{cost}(l_l|x)$ are specified, the value of $\mathrm{cost}(l|x)$ can be computed for every label sequence $l \in \Lambda^n$.

In one embodiment, the search for an optimal solution can be formulated as a shortest path problem in a graph $G = (V, E)$ constructed as follows. The node set V comprises all pairs $\{\langle t, l \rangle\}_{1 \leq t \leq n, l \in \Lambda}$, where t is the time step of a node, and l is the label of the node. There are edges from node $\langle t, l_a \rangle$ to node $\langle t+1, l_b \rangle$ for every $1 \leq t < n$ and $l_a, l_b \in \Lambda$. The edge $(\langle t, l_a \rangle, \langle t+1, l_b \rangle)$ is given weight $\Phi_t(l_b, l_a|x)$. Finally, a start node start and a goal node goal are added, and for every $l \in \Lambda$, edges (start, $\langle 1,l \rangle$) with weight $\mathrm{cost}(l|x)$, and edges ($\langle n,l \rangle$, goal) with weight 0 are added.

Observe that the label sequence $l = \langle l_1, l_2, \ldots, l_n \rangle$ corresponds to the path start, $\langle 1, l_1 \rangle, \langle 2, l_2 \rangle, \ldots$, goal, and that the weight of this path (e.g., sum of edges on this path) is exactly $\mathrm{cost}(l|x)$. Therefore, the least cost path (of length n) from start to goal corresponds to the desired optimal label sequence. Because there is one-to-one correspondence between label sequences in $\Psi$ and path in G from start to goal, the two can be used interchangeably. The label sequence l corresponds to the path start, $\langle 1, l_1 \rangle, \langle 2, l_2 \rangle, \ldots, \langle n, l_n \rangle$, goal. $\langle k, l \rangle \in l$ can be used to denote the fact that the node $\langle k, l \rangle$ is on the path $l \in \Psi$ (e.g., the $l_k = l$).

Continuing, let $\alpha(\langle k,l\rangle|x)$ be the cost of the least weight path from start to $\langle k,l\rangle$. The cost of completion of a node $\langle k,l\rangle$ is the cost of the least weight path from $\langle k,l\rangle$ to goal, which can be denoted by $\beta(\langle k,l\rangle|x)$. Observe that $\alpha(\langle k,l\rangle|x) + \beta(\langle k,l\rangle|x)$ is the cost of the least weight path from start to goal going through $\langle k,l\rangle$. That is, $$\alpha(\langle k,l\rangle|x) + \beta(\langle k,l\rangle|x) = \min_{\substack{l \in L^n \\ \langle k,l\rangle \in l}} [\text{cost}(l|x)]$$

From this, Definition 1 can be provided as follows: a function lower: $V \to P$ is an admissible underestimate if for every $\langle k,l\rangle$, two conditions are met:

Condition 1: $\text{lower}(\langle k,l\rangle|x) \leq \beta(\langle k,l\rangle|x)$.

Condition 2: $\text{lower}(\langle n,l\rangle|x) = 0$ for all $l \in \Lambda$.

Condition (1) requires the function lower to be an optimistic estimate of the cost function, while condition (2) requires the estimate to be 0 for the last states of the path. Conventionally, a well known result provides that if lower is an admissible underestimate, and $$\text{prio}(\langle k,l\rangle|x) = \text{cost}(\langle k,l\rangle|x) + (\text{lower}\langle k,l\rangle|x)$$

is used as a priority function for a priority driven search, then the optimal solution is guaranteed to be found. The admissible underestimates allow for pruning of parts of the search space, and can enable the algorithm (e.g., classifier) to find the optimal solution faster than the dynamic programming approach. However, maintaining the priority queue adds complexity to the algorithm, and hence for the technique to outperform the dynamic programming approach in practice, the estimate has to be reasonably sharp. For many cases, even when admissible underestimates can be found, the estimates tend to be loose, and hence do not result in a substantial speedup.

As noted previously, the priority function 120 employs a probable approximate underestimate. The probable approximate underestimate can be understood based on a relaxed notion of admissible underestimates and the effect on a priority driven search.

Consider Definition 2: A function $\text{lower}^\sim: V \to P$ is probably an $(\epsilon, \delta)$—approximate underestimate if, $$\text{lower}^\sim(\langle k,l\rangle|x) \leq \beta(\langle k,l\rangle|x) + \delta.$$

for every $\langle k,l\rangle$ and for a randomly drawn $(x,y) \in \Xi \times \Psi$ with probability at least $1-\epsilon$, and $\text{lower}^\sim(\langle n,l\rangle|x) = 0$ for all $l \in \Lambda$.

In this embodiment, Definition 2 essentially requires lower~ to be very close to being an underestimate most of the time. In this manner, as discussed below, using lower~ to guide the priority driven search (e.g., the priority function 120) of the system 100, a solution which is substantially optimal can be obtained (e.g., almost optimal most of the time).

Consider Lemma 3: If lower~ is probably an $(\epsilon, \delta)$—approximate underestimate, and $$\text{prio}(\langle k,l\rangle|x) = \text{cost}(\langle k,l\rangle|x) + \text{lower}^\sim(\langle k,l\rangle|x)$$

is used to guide the priority driven search, then with probability at least $1-\epsilon$, a solution within $\delta$ of optimal is found.

Proof of this lemma can be based on, if lower~ satisfies the condition for x, then a solution within $\delta$ of the optimal is found. From this, the result follows, as discussed below. Initially, it is assumed that lower~ satisfies the condition for x and that $c = \text{cost}(l^{min}|x)$ is the cost of an optimal solution $l^{min}$.

Continuing, suppose that l is the first complete solution that comes off the priority queue, and assume that $\text{cost}(l|x) > c + \delta$. Since lower~ is an approximate underestimate, $\text{lower}^\sim(l|x)$ must be equal to 0. Therefore, $\text{prio}(l|x) = \text{cost}(l|x) + \text{lower}^\sim(l|x) > c + \delta$. Since $l^{min}$ has not yet been pulled off the priority queue, either $l^{min}$ or some node $\langle k,l\rangle \in l^{min}$ must still be on the priority queue. Since there is a path from $\langle k,l\rangle$ to $l^{min}$, $\text{prio}(\langle k,l\rangle|x) \leq \text{cost}(l^{min}|x) + \delta = c + \delta$ must exist. Hence $\text{prio}(\langle k,l\rangle|x) \leq c + \delta < \text{prio}(l|x)$, which means that $\langle k,l\rangle$ should have been pulled off the priority queue before l, a contradiction.

It is to be appreciated that a probabilistic approximate underestimate is more relevant in a statistical learning context than in a classical artificial intelligence (AI) context. When the state graph is generated from a model with no uncertainty, then the optimal solution is clearly the most desirable solution. In contrast, for machine learning applications the models are statistical in nature, and even the optimal solutions are "incorrect" some percentage of the time. Therefore, if the decoding algorithm fails to come up with the optimal answer for a fraction $\epsilon$ of the cases, then the error rate goes up by at most $\epsilon$; the fundamental statistical nature of the algorithm does not change. Therefore, relaxation of the correctness requirement, as discussed above, can be beneficial to the decoding algorithm for machine learning algorithms.

Additionally, when the model parameters are estimated from small data sets, the difference between two solutions whose costs are very close may not be statistically significant. In these cases, it may make sense to settle for an approximately optimal algorithm, especially if it will result in a large saving in computation. Therefore, by employing probable approximate underestimates, priority functions can be chosen from a much richer set which can result in much faster inference.

Another consequence of using probably approximate underestimates is learning underestimates. Guaranteed underestimates are often loose, and the effectiveness of a model using these estimates must be verified through experiments. A tighter bound can be obtained by choosing a function that is the "best" underestimate on a finite training set. However, such a function is not guaranteed to be an underestimate on a different data set. However, generalization bounds from statistical learning theory can be used to show that as long as the class of underestimate functions is not too large, and the training data set is not too small, an approximate underestimate with high probability can be obtained. Learned underestimates can be much tighter (e.g., although with some probability of error).

Finally, learned probable approximate underestimates can be applied effectively to a much wider set of statistical models. A common technique for generative models is to estimate completion costs based on a summary of the context and/or grammar summarization. In a discriminative setting, where the costs take on a functional form, an estimate based on any meaningful summary of the context will be very loose. This is especially true in cases where the features are deterministically related. As discussed in greater detail below, a learned probably approximate underestimate can be directly applied to a discriminative model.

As mentioned previously, using a priority driven search algorithm can speed up computation because it can prune away large parts of the search space. However, each individual step is more expensive because priorities have to be computed, and because the priority order has to be maintained. A very good priority function that is very expensive to compute can well result in an overall decrease in speed. Therefore, it is important to consider both how quickly lower~ can be computed and how sharp it is (e.g., how well it estimates the actual cost) when determining the priority function 120.

If lower~ has a similar structure to the cost function, then it is likely that lower~ will be a sharp estimate. On the other hand, the more similar lower~ and cost are, the more similar their computational complexity is, negating the benefit of the priority driven search. In one embodiment, the cost function of a linear-chain semi-Markov model can be approximated using the cost function of a linear chain Markov model.

Linear-chain Conditional Markov Models (CMMs) and semi-Markov CMMs are discriminative models that can be used for labeling sequence data. The input to these models are sequences of observations $x = \langle x_1, x_2 \ldots x_n \rangle$, and the model produces a sequence of labels drawn from the label sequence $\Lambda$. Both models assign costs (probabilities) to label sequences conditional on the input (observation) sequence. A widely used example of a CMM is a Conditional Random Field. However, while a CRF assigns a probability to a label sequence $\langle l_1, l_2 \ldots l_n \rangle$ (conditional on the input observation sequence x), a CMM can be more general, and assign a score which can be based on a general loss function (e.g., the margin to a separating surface or on the number of votes from an ensemble). The cost that a CMM assigns to the label sequence $\langle l_1, l_2 \ldots l_n \rangle$ (conditional on the input observation x) is given by:

$$cost^{cmm}(l|x) = \sum_{t=2}^{n} \sum_{f \in \Phi_{cmm}} \lambda_f f(t, l_{t-1}, l_t, x)$$

Note that this cost could have been derived from the log-probability assigned by a linear-chain CRF whose underlying linear graphical model has (maximal) cliques with potential functions of the form:

$$\phi_t(l_{t-l}, l_t, x) = \sum_{f \in \Phi_{cmm}} -\lambda_f f(t, l_{t-l}, l_t, x)$$

A semi-Markov model is one where each hidden state is associated with a set of observations. These models provide a richer mechanism for modeling dependencies between observations associated with a single state. While the most natural language for describing such models is generative, the framework discussed below can be applied to discriminative models as well.

In a semi-Markov model, a sequence of m-labels (for $m \leq n$) are generated, and for each label, one or more observations are generated. The segment/label sequence $\langle l_{[s_1:s_2]}, l_{[s_2:s_3]}, \ldots, l_{[s_{m-1}:s_{m+1}]} \rangle$ can be denoted by the fact that label $\langle l_{[s_j,s_{j+1}]} \rangle$ generates the observations $O_{s_j}, O_{s_j+1}, \ldots, O_{s_{j+1}-1}$. Here $1 = s_1 < s_2 < \ldots < s_{m+1} = n$ denotes the segment boundaries.

The cost that the semi-Markov CMM assigns to the segment/label sequence $\langle l_{[s_1:s_2]}, l_{[s_2:s_3]}, \ldots, l_{[s_{m-1}:s_{m+1}]} \rangle$ is given by $$cost^{scmm}(\langle l_{[s_1:s_2]}, l_{[s_2:s_3]}, \ldots, l_{[s_{m-1}:s_{m+1}]} \rangle | x) = \sum_{t=1}^{m-1} \psi_{(S_{t+1}, S_{t+2})}(l_{[s_t, s_{t+1}]}, l_{[s_{t+1}, s_{t+2}]}, x)$$

where the potentials $\Psi_t$ are given by $$\psi_{(S_{t+1}, S_{t+2})}(l_{[s_{t-1}, s_t]}, l_{[s_t, s_{t+1}]}, x) = \sum_{f \in \Phi_{cmm}} \lambda_f f(s_t, s_{t+1}, l_{[s_t, s_{t+1}]}, l_{[s_{t+1}, s_{t+2}]}, ., x)$$

Each semi-Markov CMM feature $f \in \Phi_{scmm}$ can be a function of the observations, the current segment $[s_{t+1}, s_{t+2}]$, and the current and previous labels $l_{[s_{t-1}, s_t]}$ and $l_{[s_{t+1}]}$. Note that $\Phi_{scmm}$ is richer than $\Phi_{cmm}$, the set of features available to the CMM, because the semi-Markov features $f(s_t, s_{t+1}, l_{[s_t, s_{t+1}]}, l_{[s_{t+1}, s_{t+2}]}, x)$ can also depend on the entire segments $[s_t, s_{t+1}]$. As a result, semi-Markov CMMs typically yield higher accuracies than CMMs. However, the decoding time for these models is $O(n^2)$. Those skilled in the art will recognize that techniques for improving the efficiency of inference in semi-Markov CMMs by reorganizing the clique potential computation can be employed in conjunction with the technique described herein to yield greater increases in speed.

In one embodiment, $cost_{cmm}$ can be used as a probable approximate underestimate for $cost_{scmm}$. The graph $G_S = (V_S, E_S)$ can be described corresponding to the search problem for semi-Markov Models. The node set $V_s = \{\langle s, r, l \rangle : 1 \leq s < r \leq n, l \in \Lambda\} \cup \{\text{start}, \text{goal}\}$. As such, each node corresponds to the time range $[s, r]$ and label $l$. There are edges between nodes $\langle s, r, l_1 \rangle$ and $\langle r, q, l_2 \rangle$ for $1 \leq s < r < q \leq n$, and this edge has cost $$\sum_{f \in \Phi_{cmm}} \lambda_f f(s, r, t, l_1, l_2, x).$$

A common pruning step is to place a limit W on the length of the largest segment, only allowing nodes $\langle s, r, l \rangle$ which satisfy $r - s < W$. In this case, the decoding time required for the dynamic programming solution reduces to $O(n \cdot W)$. However, it is often the case that $W \in O(n)$, and hence, this may not result in substantial savings.

The cost of completion (cost to goal) is the cost of the least cost path to the goal and any function which is less than this can serve to be an optimistic estimate to the goal. $\beta_{scmm}(\langle s_k, s_{k+1}, l_k \rangle | x)$ denotes the cost of the least cost path from $\langle s_k, s_{k+1}, l_k \rangle$ to goal. A completion path is of the form $\langle s_k, s_{k+1}, l_k \rangle, \langle s_{k+1}, s_{k+2}, l_{k+1} \rangle, \ldots, \langle s_m, s_{m+1}, l_m \rangle$ where $s_{m+1} = n$, and its cost is given by $$\sum_{t=k}^{m-1} \psi(S_t, S_{t+1}, S_{t+2})(l_{[s_t, s_{t+1}]}, l_{[s_{t+1}, s_{t+2}]} | x)$$

So $\beta scmm(\langle s_k, s_{k+1}, l_k \rangle)$ is the least value of all costs of the above form (this can be computed by dynamic programming in polynomial time). The next step is to estimate a function that will serve as a probabilistic approximate underestimate for β. Given the similarity in the forms of the cost functions of CMMs, $cost_{cmm}$, and the cost functions of the semi-Markov Model, $cost_{scmm}$, it is intuitive to determine if $cost_{cmm}$ can be used to generate the desired probabilistic approximate underestimate for the priority function 120.

Given a CMM search graph with nodes ⟨t,l⟩ and a semi-Markov Model with nodes ⟨s,r,l⟩, a mapping can be performed: ⟨s,r,l⟩↦⟨s,l⟩ (e.g., a many-to-one mapping). $\beta_{scmm}$(⟨s,r,l⟩) can be estimated using $\beta_{cmm}$(⟨s,l⟩). For this, it is desired that:

$$\beta_{cmm}(\langle s,l \rangle|x) \leq \beta_{scmm}(\langle s,r,l \rangle|x) + \delta$$

for every node ⟨s,r,l⟩∈$V_s$ for all but an ϵ fraction of the input/output pairs.

Therefore, (the parameters of) a CMM are sought, which satisfies this condition. Observe that this is a circularity in the requirements here. The optimal path used for completion in the CMM depends on the $cost_{cmm}$. However, it is desired to pick $cost_{cmm}$ based on the optimal completion path. In one embodiment, the following can be employed to resolve this circularity. Let F=⟨$z_1$, $z_2$, . . . , $z_n$⟩ be the label sequence generated by a computationally cheap classifier (e.g., a classifier obtained by boosting small-depth decision trees). For any node, ⟨s,l⟩∈V, a completion path P(z, ⟨s,l⟩)=⟨s,l⟩, ⟨s+1,$z_{s+1}$⟩, . . . , ⟨$s_n$,$z_n$⟩ can be generated. $Cost_{cmm}$ can be selected to satisfy:

$$cost_{cmm}(P(z,\langle s,l \rangle)) \leq \beta_{scmm}(\langle s,r,l \rangle|x) + \delta \quad \text{Eq. (1)}$$

Since the cost of the optimal path is less than the cost of any fixed path:

$$\beta_{cmm}(\langle s,l \rangle|x) \leq cost_{cmm}(P(z,\langle s,l \rangle)) \leq \beta_{scmm}(\langle s,r,l \rangle|x) + \delta$$

Therefore, if $cost_{cmm}$ can be found probably satisfying this condition, it can be used as a probabilistic approximate underestimate. This condition translates to $$\sum_{t=s}^{n} \sum_{f \in \Phi_{cmm}} \lambda_f f(t, l_{t-1}, l_t|x) = \sum_{t=s}^{n} \phi_t(t, l_{t-1}, l_t|x)$$
$$= cost_{cmm}(P(z, \langle s, l \rangle|x)$$
$$\leq \beta_{scmm}(\langle s, r, l \rangle|x) + \delta$$

where $l_t$=l, if s≤t≤r, and, $z_t$ otherwise.

The parameters (variables) of the priority function 120 that can be selected are $\{\lambda_f\}_{f \in \Phi_{cmm}}$. In one embodiment, these values can be estimated from data as the solution to an optimization problem.

Figure 2:
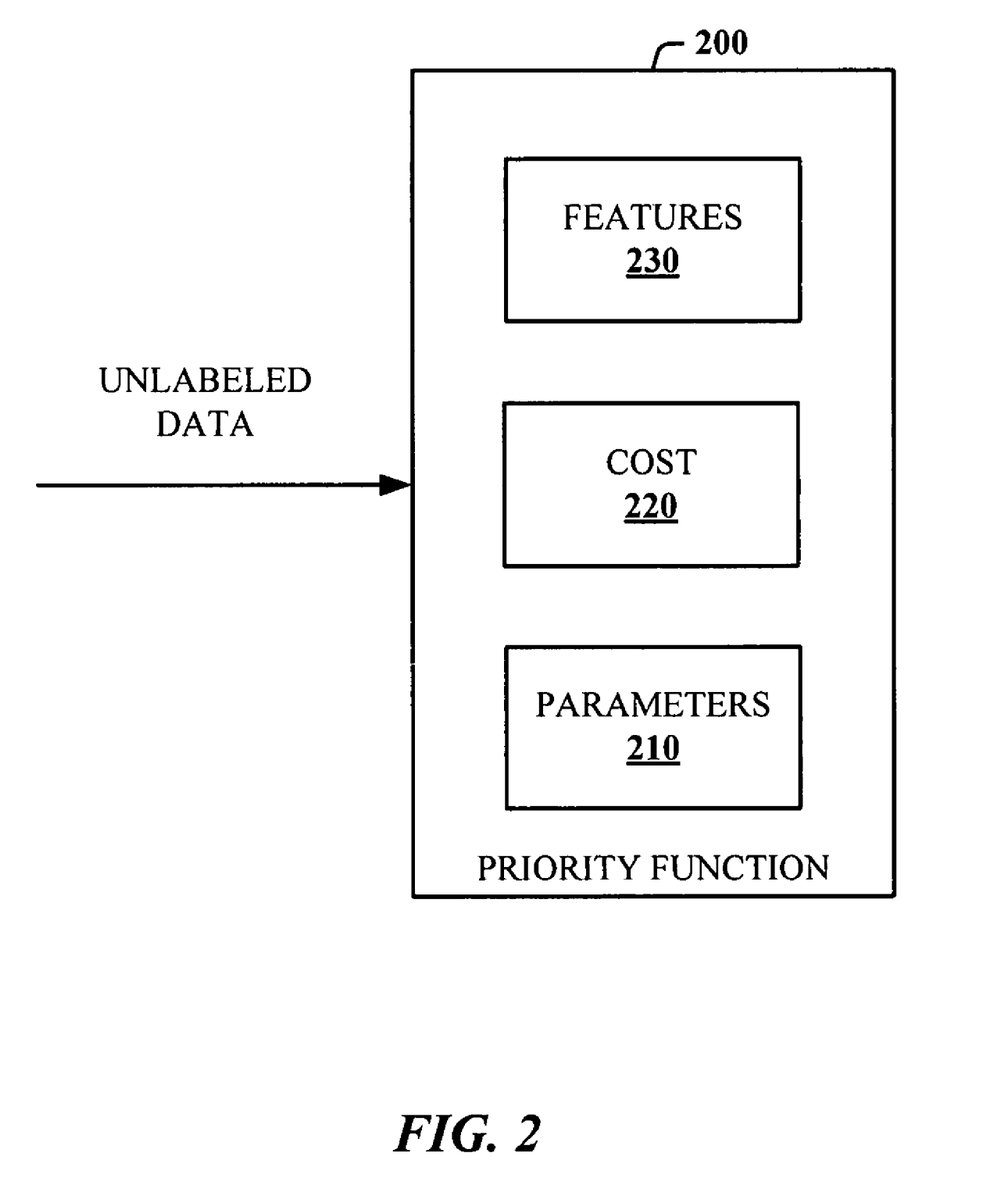
FIG. 2 illustrates a priority function estimated from data as a solution to an optimization problem.

Referring to FIG. 2, a priority function 200 estimated from data as a solution to an optimization problem is illustrated. First, suppose that a collection of unlabeled sequences $\{x^{(i)}\}_{i=1}^{N}$, and a trained semi-Markov model are provided. It is desired to estimate parameters 210 of a CMM $\{\lambda_f\}_{f \in \Phi_{cmm}}$ so that the resulting cost function satisfies Equation (1) above. For each sequence $x^{(i)}$, let $z^{(i)}$ be the output label sequence from a computationally simple classifier. For each example 1≤i≤N, and for each state ⟨s,r,l⟩, let:

$$\delta_{(i,s,r,l)} = \sum_{t=s}^{n} \sum_{f \in \Phi_{cmm}} \lambda_f f(t, l_{t-1}, l_t|x^{(i)}) - \beta_{scmm}(\langle s, r, l \rangle|x^{(i)})$$

By taking:

$$\delta_{(i,s,r,l)} \leq \delta - \mu \quad \text{Eq. (2)}$$

(where μ≥0 is analogous to a margin) Equation (1) is satisfied. The details are omitted for the sake of brevity, but generalization bounds, much like those obtained for support vector machines (SVMs) can be obtained for the underestimate as well. The reason for introducing the "margin" μ is introduced to enable proof of the generalization bounds (e.g., so that the resulting solution which is an approximate underestimate on the test set is also an approximate underestimate on the training set). Larger values of μ and N make it more likely that the generated CMM will also be an underestimate on the test set. However, in one embodiment, smaller values of μ are desirable because this allows for tighter bounds.

In one embodiment, the value of a cost function 220 $\beta_{scmm}$(⟨s,r,l⟩|$x^{(i)}$) can be computed for all values of ⟨s,r,l⟩ by simply running the dynamic programming algorithm and then reading the values off a table used to store partial results. While this can be an expensive operation, it only has to be done offline, and only once (e.g., per example). Similarly, values of features 230 of the semi-Markov model f(t, $l_{t-1}$, $l_t$|$x^{(i)}$) can be computed for the examples once offline and hence the system of inequalities can be set up.

Observe that |$\delta_{(i,s,r,l)}$| measures the inexactness of the estimate. The smaller this quantity, the better the estimate. If $\delta_{(i,s,r,l)}$ is negative, then $$\sum_{t=s}^{n} \sum_{f \in \Phi_{cmm}} \lambda_f f(t, l_{t-1}, l_t|x^{(i)})$$

is an underestimate for $\beta_{scmm}$(⟨s,r,l⟩|$x^{(i)}$). Enforcing the constraint given in Equation (2) ensures that an overestimate, if any cannot be more than δ−μ. In one embodiment, in order to make the estimate as sharp as possible, |$\delta_{(i,s,r,l)}$| is minimized and therefore, the objective function that is used for the constrained optimization is:

$$\lambda \cdot \|f\| + \Sigma |\delta_{(i,s,r,l)}|$$

The term λ·||f|| acts as a regularizer. Both the $l_1$ and the $l_2$ norms can be used as both yield (different) generalization bounds because for a finite dimensional space, all norms differ by at most a constant. The advantage of using the $l_1$ norm is that it often yields more sparse solutions, yielding added speedups by discarding features whose coefficients are zero. When using the $l_1$ norm, the resulting problem is a linear programming problem. When using the $l_2$ norm, the resulting problem is a quadratic programming problem (e.g., similar to a standard SVM problem).

Therefore, in this formulation, there are at most |$\Phi_{cmm}$|+ $n^2$·N|Λ| variables, and at most $n^2$·N|Λ| inequalities (plus the box constraints). Since the procedure only requires unlabeled examples, in one embodiment, the procedure is fed a tremendous amount of data. Since the size of the optimization problem (both the number of variables and the number of constraints) grows linearly with the number of examples N, the problem as formulated above very rapidly exhausts the capacity of most optimization procedures. However, as discussed below, two techniques can be used to extend the range of these procedures: (1) generating sparse problem formulations; and, (2) discarding inessential inequalities.

With respect to generating sparse problem formulations, representing n, equations/inequalities in $n_2$ variables using a dense matrix requires $O(n_1 \cdot n_2)$ storage when using a dense matrix representation. When the problem can be formulated so that the equations/inequalities are sparse (e.g., so each inequality involves only a small number of variables), and if the optimization solver is able to exploit the sparsity of the formulation, both efficient representations and efficient solution procedures can be obtained. This allows for the storage of larger problems in memory, and for the problems to be solved more quickly. A slight modification of the formulation presented allows for the reduction of the number of non-zero entries significantly. For a fixed example $x^{(i)}$, consider the set of equations:

$$\delta_{(i,s,r,l)} = \sum_{t=s}^{n} \sum_{f \in \Phi_{cmm}} \lambda_f f(t, l_{t-1}, l_t | x^{(i)}) - \beta_{scmm}(\langle s, r, l \rangle | x^{(i)})$$

Let:

$$\gamma(i, t) = \sum_{f \in \Phi_{cmm}} \lambda_f f(t, z_{t-1}, z_t | x^{(i)})$$

Then:

$$\delta_{(i,s,r,l)} = \sum_{t=s}^{n} \gamma(i, t) - \beta_{scmm}(\langle s, r, l \rangle | x^{(i)})$$

Observe that these two systems of equations are equivalent, except the second formulation has substantially fewer non-zero entries even though a few extra variables (e.g., n·N extra variables) have been added.

In another embodiment, in order to reduce the memory footprint, and speeding up the solution, several of the inequalities can be discarded completely. For example, $y^{(i)}$ be the optimal label sequence for the input sequence $z^{(i)}$. Then as long as Equation (1) holds for all the nodes on the optimal label sequence, then the result of Lemma 3 still holds. In fact, it is preferred that nodes that are not part of the optimal sequence get very pessimistic estimates, as this ensures that the nodes are not explored further, increasing the speed of the search algorithm. Therefore, if the inequalities corresponding to the nodes which are not part of the optimal label sequence are discarded, then while the CMM so generated will no longer be an approximate probabilistic underestimate, it is still guaranteed to produce approximately optimal solutions on the training data.

Figure 3:
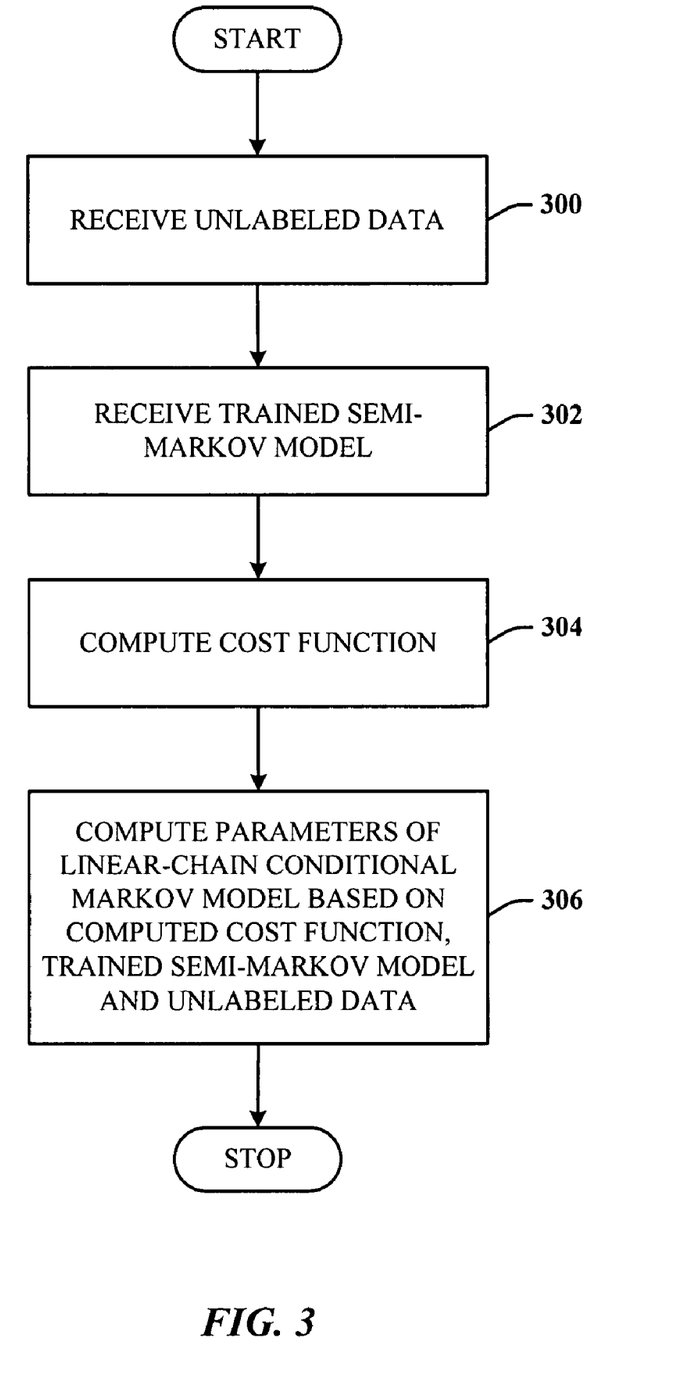
FIG. 3 illustrates a method of learning a priority function utilizing a probable approximate estimate.

FIG. 3 illustrates a method of learning a priority function utilizing a probable approximate estimate. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 300, unlabeled data is received (e.g., a collection of raw data). At 302, a trained semi-Markov model is received. At 304, a cost function is computed (e.g., obtaining values from a dynamic programming algorithm). At 306, parameters of a linear-chain conditional Markov Model are computed based on the computed cost function, the trained semi-Markov model and the unlabeled data.

Figure 4:
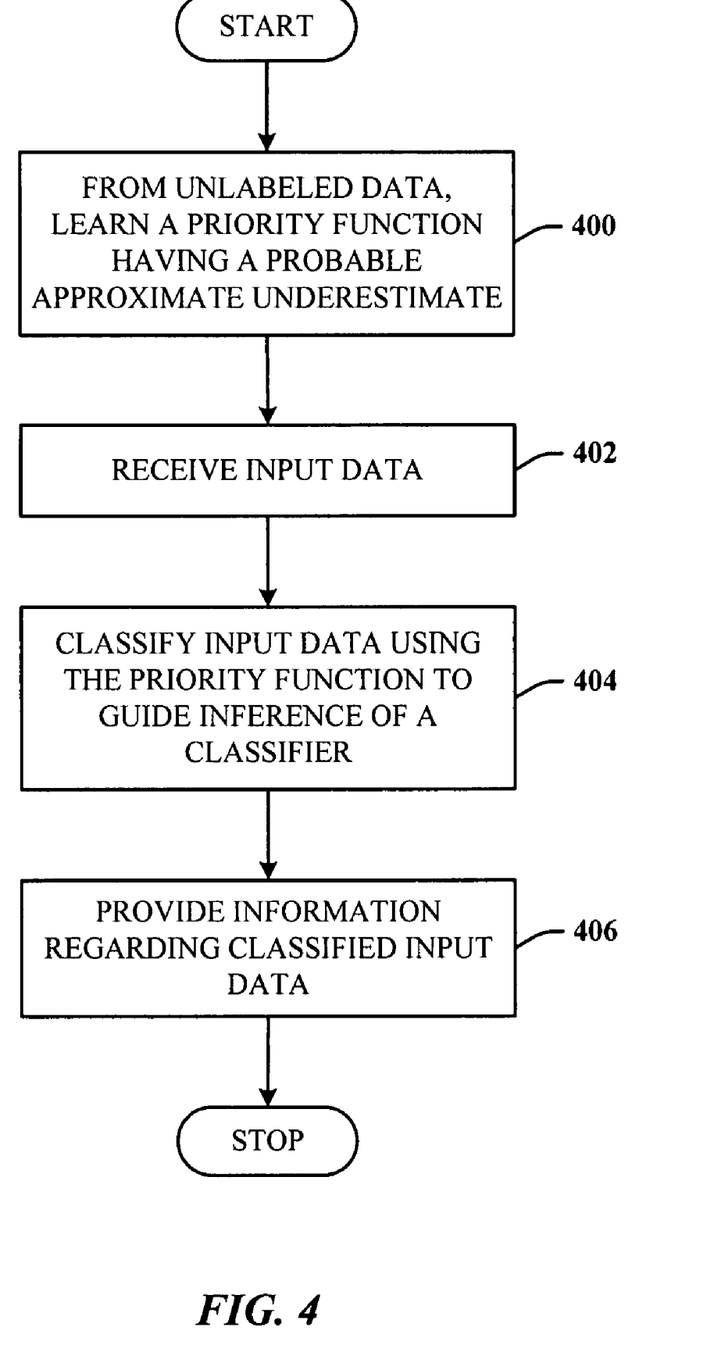
FIG. 4 illustrates a method of classifying data.

FIG. 4 illustrates a method of classifying data. At 400, a priority function having a probable approximate underestimate is learned from unlabeled data. At 402, input data is received. At 404, the input data is classified using the priority function to guide inference of a classifier. At 406, information regarding the classified input data is provided (e.g., structured output of the data).

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 5:
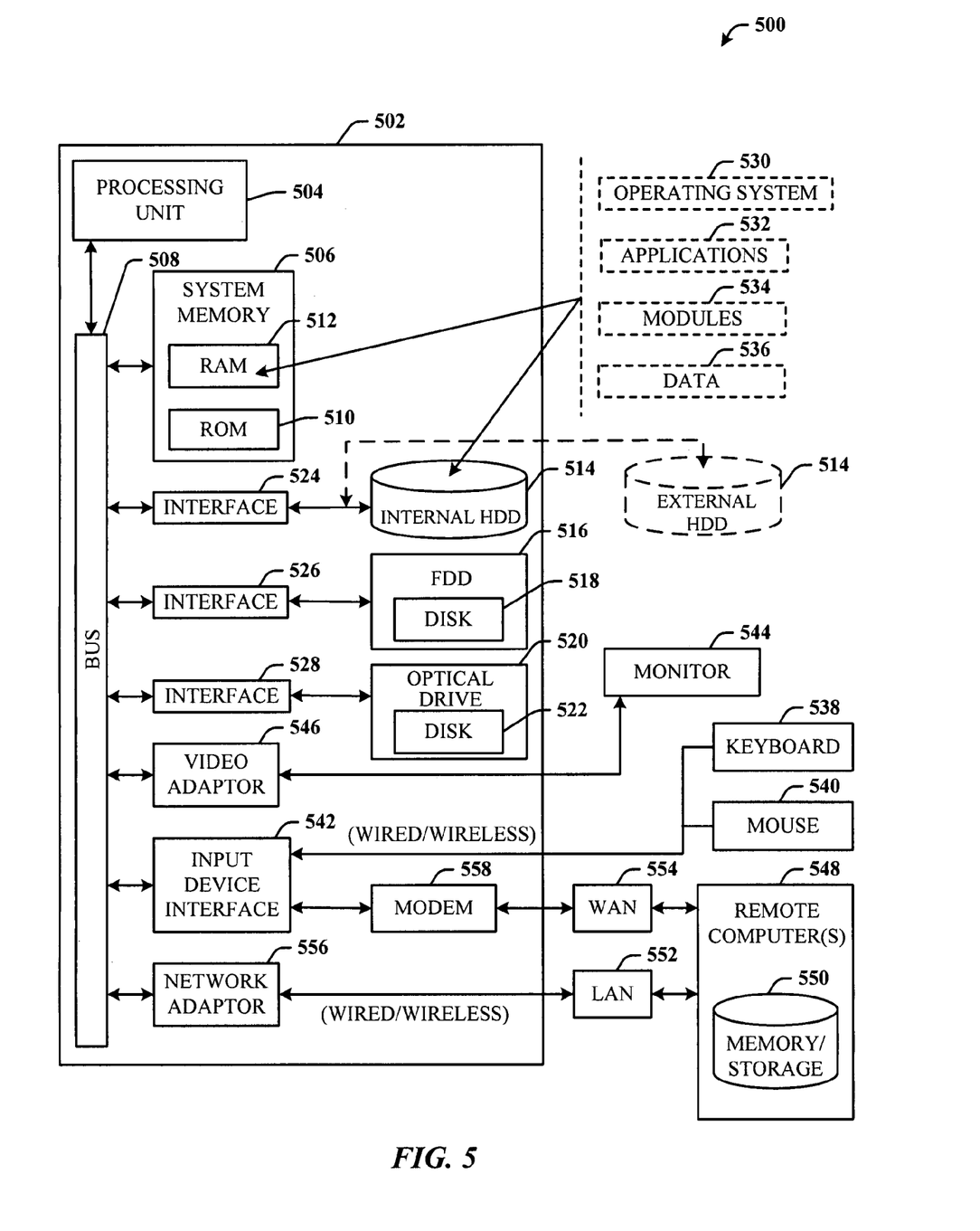
FIG. 5 illustrates a computing system operable to execute the disclosed architecture.

Referring now to FIG. 5, there is illustrated a block diagram of a computing system 500 operable to execute the disclosed technique. In order to provide additional context for various aspects thereof, FIG. 5 and the following discussion are intended to provide a brief, general description of a suitable computing system 500 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 5, the exemplary computing system 500 for implementing various aspects includes a computer 502, the computer 502 including a processing unit 504, a system memory 506 and a system bus 508. The system bus 508 provides an interface for system components including, but not limited to, the system memory 506 to the processing unit 504. The processing unit 504 can be any of various commercially available processors. Dual microprocessors and other multi-processor architectures may also be employed as the processing unit 504. Referring briefly to FIGS. 1 and 5, the classification function 110 and/or the priority function 120 can be stored in the system memory 506.

The system bus 508 can be any of several types of bus structure that may further interconnect to a memory bus (with or without a memory controller), a peripheral bus, and a local bus using any of a variety of commercially available bus architectures. The system memory 506 includes read-only memory (ROM) 510 and random access memory (RAM) 512. A basic input/output system (BIOS) is stored in a non-volatile memory 510 such as ROM, EPROM, EEPROM, which BIOS contains the basic routines that help to transfer information between elements within the computer 502, such as during start-up. The RAM 512 can also include a high-speed RAM such as static RAM for caching data.

The computer 502 further includes an internal hard disk drive (HDD) 514 (e.g., EIDE, SATA), which internal hard disk drive 514 may also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high capacity optical media such as the DVD). The hard disk drive 514, magnetic disk drive 516 and optical disk drive 520 can be connected to the system bus 508 by a hard disk drive interface 524, a magnetic disk drive interface 526 and an optical drive interface 528, respectively. The interface 524 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 512, including an operating system 530, one or more application programs 532, other program modules 534 and program data 536. All or portions of the operating system, applications, modules, and/or data can also be cached in the RAM 512. It is to be appreciated that the disclosed architecture can be implemented with various commercially available operating systems or combinations of operating systems.

A user can enter commands and information into the computer 502 through one or more wired/wireless input devices, for example, a keyboard 538 and a pointing device, such as a mouse 540. Other input devices (not shown) may include a microphone, an IR remote control, a joystick, a game pad, a stylus pen, touch screen, or the like. These and other input devices are often connected to the processing unit 504 through an input device interface 542 that is coupled to the system bus 508, but can be connected by other interfaces, such as a parallel port, an IEEE 1394 serial port, a game port, a USB port, an IR interface, etc.

A monitor 544 or other type of display device is also connected to the system bus 508 via an interface, such as a video adapter 546. In addition to the monitor 544, a computer typically includes other peripheral output devices (not shown), such as speakers, printers, etc.

The computer 502 may operate in a networked environment using logical connections via wired and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wired/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the local network 552 through a wired and/or wireless communication network interface or adapter 556. The adaptor 556 may facilitate wired or wireless communication to the LAN 552, which may also include a wireless access point disposed thereon for communicating with the wireless adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wired or wireless device, is connected to the system bus 508 via the serial port interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 6:
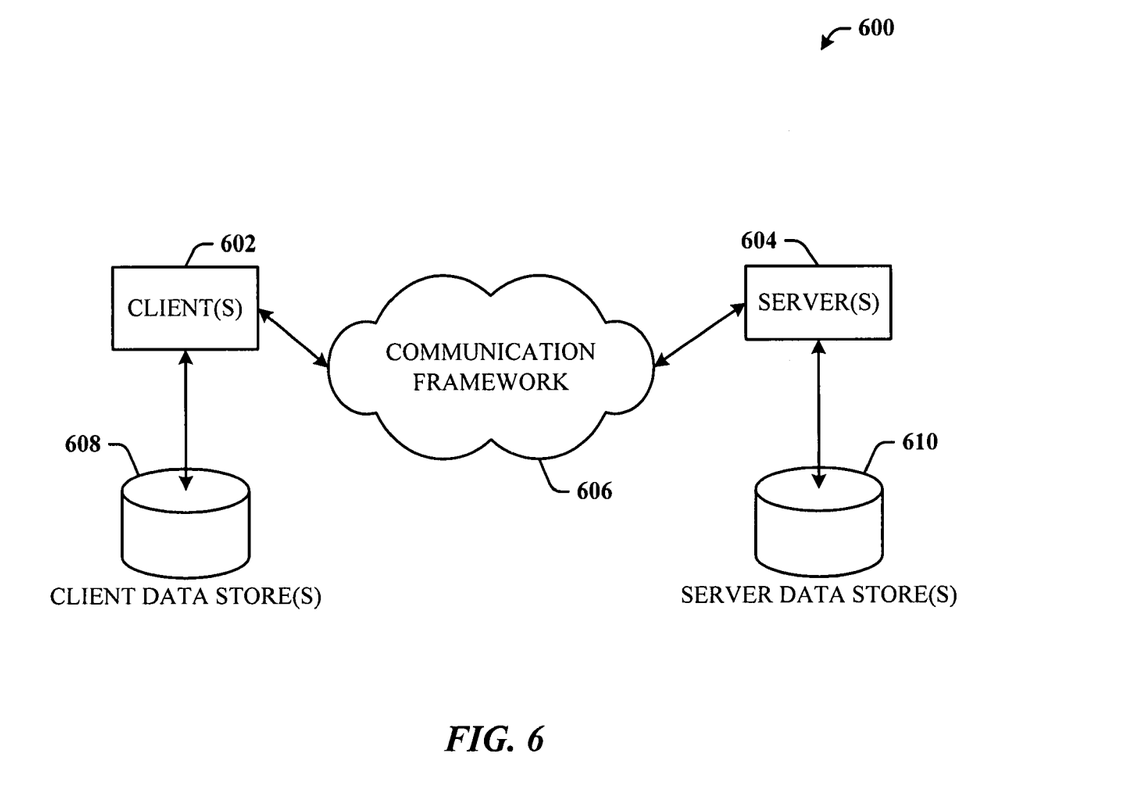
FIG. 6 illustrates an exemplary computing environment.

Referring now to FIG. 6, there is illustrated a schematic block diagram of an exemplary computing environment 600 that facilitates inference of structured variables. The system 600 includes one or more client(s) 602. The client(s) 602 can be hardware and/or software (e.g., threads, processes, computing devices). The client(s) 602 can house cookie(s) and/or associated contextual information, for example.

The system 600 also includes one or more server(s) 604. The server(s) 604 can also be hardware and/or software (e.g., threads, processes, computing devices). The servers 604 can house threads to perform transformations by employing the architecture, for example. One possible communication between a client 602 and a server 604 can be in the form of a data packet adapted to be transmitted between two or more computer processes. The data packet may include a cookie and/or associated contextual information, for example. The system 600 includes a communication framework 606 (e.g., a global communication network such as the Internet) that can be employed to facilitate communications between the client(s) 602 and the server(s) 604.

Communications can be facilitated via a wired (including optical fiber) and/or wireless technology. The client(s) 602 are operatively connected to one or more client data store(s) 608 that can be employed to store information local to the client(s) 602 (e.g., cookie(s) and/or associated contextual information). Similarly, the server(s) 604 are operatively connected to one or more server data store(s) 610 that can be employed to store information local to the servers 604.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for inferring structured variables, comprising:
   a priority function comprising a probable approximate underestimate to compute a probable approximate solution to an inference problem; and,
   a classification function, based on a semi-Markov conditional random field model, which assigns a score to a plurality of hypothetical structured variables, and through inferencing, searches for a best scoring hypothesis where the search is guided by the probable approximate underestimate of the priority function, to provide a structured output of unlabeled data based on classification information computed by the classification function.

2. The system of claim 1, wherein the probable approximate underestimate of the priority function is learned from the unlabeled data.

3. The system of claim 1, wherein the classification function is based on a linear-chain conditional Markov model.

4. The system of claim 1, wherein the search for the best scoring hypothesis employs an A* algorithm.

5. The system of claim 1, wherein the priority function is based on a linear-chain conditional Markov model.

6. The system of claim 1, wherein the priority function prunes part of a search space to increase efficiency of the classification function.

7. The system of claim 1, wherein the priority function is based on $\text{prio}(\langle k, l \rangle | x) = \text{cost}(\langle k, l \rangle | x) + \text{lower} \sim (\langle k, l \rangle | x)$, where prio( ) is the priority function, x is an observation, k is a partial solution, l is a label, cost( ) is a cost function, and lower~( ) is a probable approximate underestimate function.

8. The system of claim 1 employed to perform entity-extraction.

9. The system of claim 1 employed to perform document classification.

10. The system of claim 1 employed to perform spam detection.

11. A computer-implemented method of learning a priority function utilizing a probable approximate estimate, comprising:
    receiving unlabeled data comprising a collection of raw data;
    receiving a trained semi-Markov model in which a hidden state is associated with a set of observations;
    computing a cost function; and,
    computing parameters of a linear-chain conditional Markov model based on the computed cost function, the trained semi-Markov model, and the unlabeled data, the priority function comprising the linear-chain conditional Markov model.

12. The method of claim 11, wherein the priority function is employed in conjunction with a classification function to classify data.

13. The method of claim 12, wherein the classification function employs an A* algorithm.

14. The method of claim 11, wherein computing the cost function comprises obtaining values from a dynamic programming algorithm.

15. The method of claim 11, wherein the trained semi-Markov model comprises values of features of the semi-Markov model trained offline.

16. A computer-implemented method of classifying data, comprising:
    learning a priority function from unlabeled data comprising a collection of raw data, the priority function comprising a probable approximate underestimate;
    receiving input data; and,
    classifying the input data using a semi-Markov conditional random field model that employs the probable approximate underestimate of the priority function to guide inference of a classifier.

17. The method of claim 16, wherein the classifier employs an A* algorithm.

18. The method of claim 17, further comprising providing information regarding the classified input data.

19. The method of claim 18, wherein the information regarding the classified input data is a structured output of the input data.

* * * * *